(12) United States Patent
Langtry

(10) Patent No.: US 12,399,094 B2
(45) Date of Patent: Aug. 26, 2025

(54) FLUID FREE HYDROSTATIC PRESSURE TESTING

(71) Applicant: Tokamak Energy Ltd, Abington (GB)

(72) Inventor: Tony Langtry, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 364 days.

(21) Appl. No.: 17/772,421

(22) PCT Filed: Oct. 7, 2020

(86) PCT No.: PCT/EP2020/078164
§ 371 (c)(1),
(2) Date: Apr. 27, 2022

(87) PCT Pub. No.: WO2021/083627
PCT Pub. Date: May 6, 2021

(65) Prior Publication Data
US 2022/0373443 A1    Nov. 24, 2022

(30) Foreign Application Priority Data
Oct. 30, 2019   (GB) ...................................... 1915758

(51) Int. Cl.
*G01N 3/12*   (2006.01)
*G01N 1/36*   (2006.01)

(52) U.S. Cl.
CPC .................. *G01N 3/12* (2013.01); *G01N 1/36* (2013.01); *G01N 2203/0019* (2013.01); *G01N 2203/0232* (2013.01); *G01N 2203/0282* (2013.01)

(58) Field of Classification Search
CPC .... G01N 3/12; G01N 1/36; G01N 2203/0019; G01N 2203/0232; G01N 2203/0282

USPC ............................................................ 73/37
See application file for complete search history.

(56) References Cited

U.S. PATENT DOCUMENTS

| | | | |
|---|---|---|---|
| 3,044,113 A | 7/1962 | George et al. | |
| 2003/0126922 A1 | 7/2003 | Coleman | |

FOREIGN PATENT DOCUMENTS

| | | |
|---|---|---|
| CN | 203658163 U | 6/2014 |
| CN | 208026556 U | 10/2018 |
| CN | 108760482 A | 11/2018 |
| EP | 1189051 A1 | 3/2002 |

OTHER PUBLICATIONS

International Search Report and Written Opinion for Application No. PCT/EP2020/078164 dated Dec. 16, 2020 (14 pages).
United Kingdom Patent Office Search Report and Written Opinion for Application No. GB1915758.5 dated Mar. 6, 2020 (3 pages).
International Preliminary Report on Patentability for Application No. PCT/EP2020/078164 dated May 12, 2022 (10 pages).

*Primary Examiner* — Peter J Macchiarolo
*Assistant Examiner* — Rodney T Frank
(74) *Attorney, Agent, or Firm* — Michael Best & Friedrich LLP

(57) ABSTRACT

An apparatus for providing pressure to a sample. The apparatus comprises a housing having a cavity, an elastomer within the cavity, and a means for providing pressure to the elastomer within the cavity. The housing and the elastomer are configured to allow a sample to be inserted into the cavity, such that the sample is surrounded by the elastomer and such that the elastomer and the sample together fill the cavity.

9 Claims, 2 Drawing Sheets

FLUID FREE HYDROSTATIC PRESSURE TESTING

CROSS-REFERENCE TO RELATED APPLICATION(S)

This application is a national phase entry of PCT/EP2020/078164, filed on Oct. 7, 2020, which claims priority to GB 1915758.5, filed on Oct. 30, 2019, the entire contents of each are fully incorporated herein by reference.

FIELD OF THE INVENTION

This invention relates to pressure testing methods and equipment. In particular, the invention relates to methods and equipment for providing pressure approximating hydrostatic pressures without the use of liquid media.

BACKGROUND

The use of high temperature superconductors (HTS) in electromagnets allows large currents (and therefore high magnetic fields) to be sustained for long periods. However, this creates an engineering challenge—the forces involved in such a large magnet can be huge, creating pressures of over 100 MPa. The performance of HTS tapes under such pressures is not well studied, so testing is needed to determine which HTS tapes and/or cable structures can survive such pressures.

Conventionally, high pressure testing of this kind would be done with a solid anvil. In principle, it could also be done in a liquid medium. The use of a solid anvil results in stress concentrations due to non-uniformity of either the anvil or the sample under test.

This is shown in FIG. 1, which is a picture of a sample of pressure-sensitive film 100 after pressure was applied using a solid anvil. Darker regions of the film 100 are the result of higher pressures being applied to the film—and as can be seen, the results are uneven across all of the samples shown. This makes solid anvils useless for testing HTS tape, as the high pressures where the stress is concentrated will cause significant damage to the tape, even if an even application of the test pressure would not.

The use of a liquid medium eliminates the problem of stress concentrations—with the test piece held within a pressurised liquid, the pressure on it is hydrostatic—i.e. even and isotropic. However, at the high pressures required for testing, the hydraulic medium will likely penetrate the sample under test, which can prevent its use in further testing. For example, if the sample under test is intended to be tested for conductivity following the pressure test, then the intrusion of the hydraulic medium will change the results of the electrical tests. Even if the sample is sealed such that the hydraulic medium cannot penetrate, then it will likely be wetted by the medium, and the engineering required to prevent leaks under such high pressures is complex.

While the issues above have been described for the testing of HTS tapes and cables, the same would apply to any test piece—if the test piece has any surface irregularities, then the use of a solid anvil will result in stress concentrations, and if is it possible for a hydraulic medium to infiltrate a test piece, then it will do so under such high pressures.

There is therefore a need for a pressure testing device and method which does not have any of the above mentioned disadvantages.

SUMMARY

According to a first aspect, there is provided an apparatus for providing pressure to a sample. The apparatus comprises a housing having a cavity, an elastomer within the cavity, and a means for providing pressure to the elastomer within the cavity. The housing and the elastomer are configured to allow a sample to be inserted into the cavity, such that the sample is surrounded by the elastomer and such that the elastomer and the sample together fill the cavity.

According to a second aspect, there is provided a method of providing pressure to a sample. A housing is provided, having within it a cavity, and an opening into the cavity. The sample is inserted into the cavity such that it is surrounded by an elastomer, and such that the sample and the elastomer together fill the cavity. Pressure is applied to the elastomer within the cavity

DETAILED DESCRIPTION

It has been found that, when confined in cavity such that it is entirely filled, an incompressible elastomer (e.g. silicone rubber) will act analogously to a hydraulic medium for small displacements. This principle can be used to make a pressure testing device as illustrated in FIG. 2.

Figure 2:
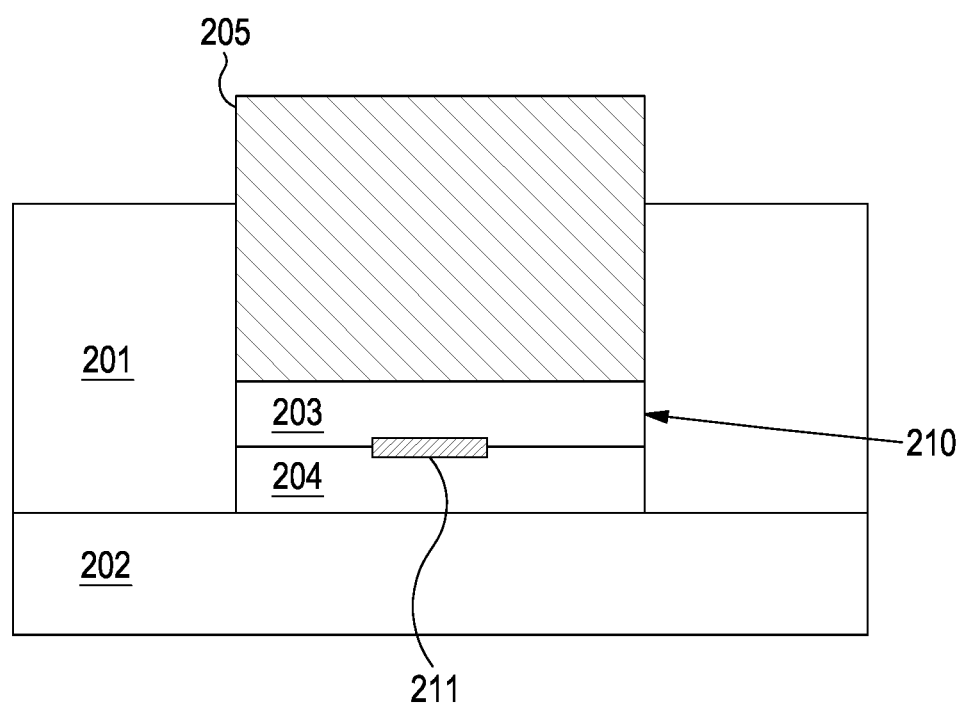
FIG. 2 is a schematic diagram of a testing device.

The testing device of FIG. 2 comprises an upper housing 201, a lower housing 202, an upper elastomer pad 203, a lower elastomer pad 204, and a piston 205. The upper and lower housings fit together to form a cavity 210, with the upper housing having an opening into which the piston is inserted. The upper and lower elastomer pads together fill the cavity.

To perform a pressure test, the lower housing is provided with the lower elastomer pad in place, and a sample 211 to be tested is placed on the lower housing. The upper elastomer pad and upper housing are then placed on top, so that the upper and lower housing form the cavity, and the sample is sandwiched between the upper and lower elastomer pads. In this example, the elastomer pads are shaped to fill the cavity when no test sample is present—so when a test sample is present the housings may be slightly offset or the piston slightly raised compared to their positions when the test sample is not present. The upper and lower housings are then fixed into place, such that the size of the cavity is preserved when force is applied.

Figure 1:
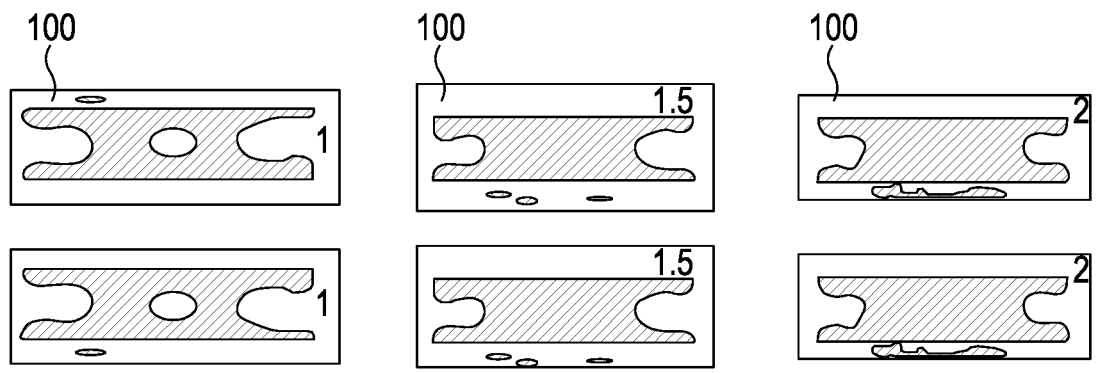
FIG. 1 shows the results of testing of a solid anvil pressure testing device with pressure sensitive film.
Figure 3:
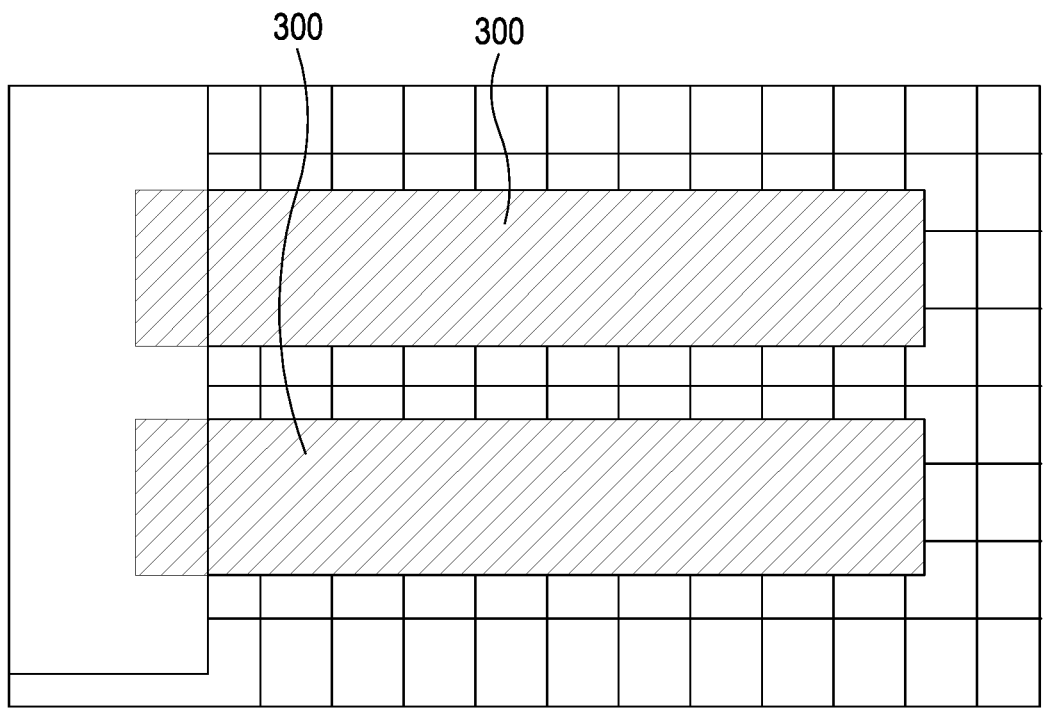
FIG. 3 shows the results of testing a testing device according to FIG. 2 with pressure sensitive film.

Once the sample and the elastomer pads are in place in the cavity, the piston is used to provide the required pressure to the elastomer (with the pressure being easily determined by the force delivered by the piston, and the contact area between the piston and the elastomer). This pressure will be even throughout the elastomer, in a substantially similar manner to hydrostatic pressure in a fluid. This is shown in FIG. 3, which shows the results of testing of a similar device with pressure sensitive tape 300 as previously described with reference to FIG. 1. As can be seen in FIG. 3, the tape is a uniform colour, indicating that the pressure applied was uniform. Because the elastomer is solid, it will not infiltrate the sample, and the seal between the upper and lower housings does not have to be fluid-tight. The elastomer is preferably in direct contact with the sample.

To ensure that the elastomer does not expand outside the cavity, the piston should be a close tolerance fit to the opening of the upper housing, and the upper and lower housings should come together cleanly. The piston may be any suitable shape (usually a cylinder, though this is not required), and the force on the piston may be provided by any suitable means—e.g. a hydraulic press, by the addition of weights to the piston, or similar. The approximately hydrostatic pressure in the elastomer during testing is given by the force applied by the piston divided by the contact area between the piston and the elastomer ($P=F/A$). Therefore, a smaller contact area allows a smaller force to be provided to obtain a given pressure. The exact size of the contact area will be a trade off between the force required, the strength of the piston (e.g. its ability to withstand the force without buckling), and other design factors such as the travel distance of the piston (the smaller the piston, the longer the travel required).

Figure 4:
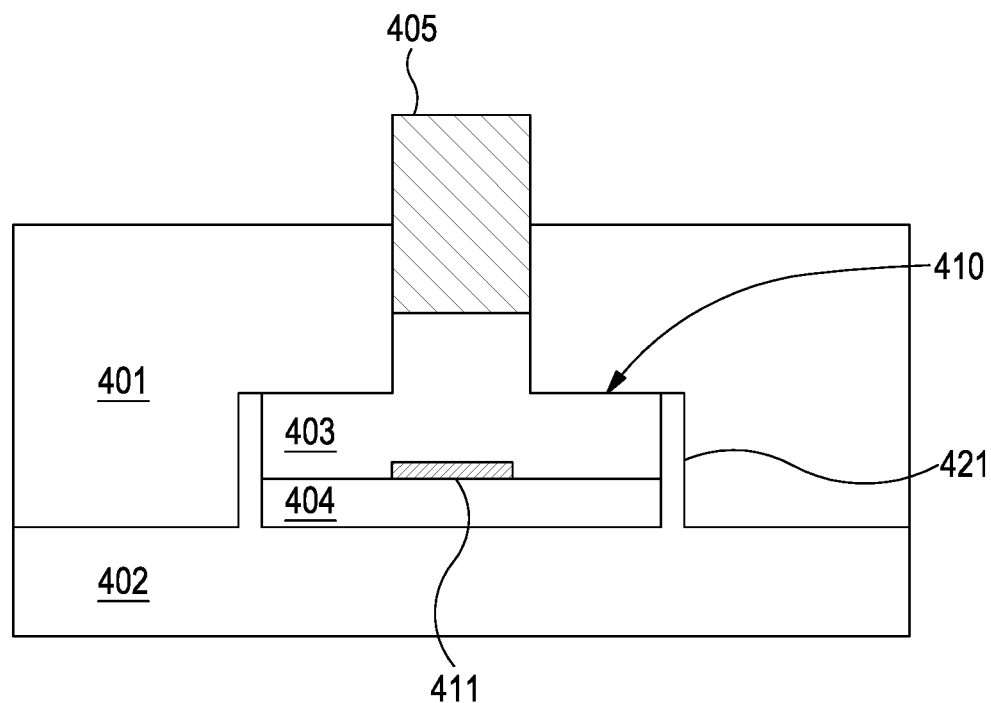
FIG. 4 is a schematic diagram of a further testing device.

FIG. 4 shows an alternative construction of the testing device, presenting several optional features which may be used together or separately. As with FIG. 2, the device comprises an upper housing 401, a lower housing 402, an upper elastomer pad 403, a lower elastomer pad 404, and a piston 405. The upper and lower housings fit together to form a cavity 410, with the upper housing having an opening into which the piston is inserted. The upper and lower elastomer pads together fill the cavity. The sample 411 is inserted between the upper and lower elastomer pads.

The cavity 410 has an "inverted T-shape" cross section, i.e. having a large open region at the bottom (where the sample is inserted), and an upper region with a smaller cross section. This allows a large region for insertion of the sample to be provided, even for a relatively small piston. It also provides a mechanical advantage, allowing a large pressure to be applied over a relatively large sample.

The lower housing 402 has a raised wall 421, which sits inside and adjacent to the inner surface of the upper housing and extends around the inside of the cavity. When the testing apparatus is pressurised, the wall will be pushed outwards, towards the outer housing, by the pressure. This will cause the wall to seal more tightly against the outer housing, preventing any extrusion of elastomer between the adjacent portions of the upper and lower housings. The wall may extend the full height of the cavity, to an overhang in side of the outer housing (e.g. within the lower region of the "inverted T shape"), or up to only a portion of the cavity's height.

Where the volume of the sample is a significant proportion of the volume of the cavity, and/or the sample has vertical discontinuities which would prevent the elastomer from conforming to its shape during pressure testing, the above approach of providing elastomer pads which fill the cavity when the sample is not present will have some issues. In particular, for "large" samples, it may not be possible to close the cavity while the sample is inserted (as the small amount of freedom of movement of the piston cannot account for the volume of the sample), and for samples with a significant vertical discontinuity the pressure applied may not be even (due to voids where the elastomer cannot conform to the shape of the sample).

As an alternative to providing elastomer pads which fill the cavity when a sample is not present, the elastomer pads may be shaped such that they fill the cavity together with the sample—i.e. the pads fill the cavity, except for a void which approximately matches the size and shape of the sample(s) to be tested. This may be achieved by casting the elastomer into place with the sample in-situ—which may result in a monolithic elastomer within the housing during pressure testing, rather than a plurality of pads (e.g. if the sample is not removed from the elastomer and replaced between casting of the elastomer and performing the pressure test).

It should be noted that the terms "horizontal" and "vertical" have been used herein assuming a piston that exerts a force vertically downwards—this is not necessary for the functioning of the testing apparatus, and the force may be provided in any direction (or the apparatus oriented in any direction). The exception is a force provided directly by gravity, which will of course be downwards.

While the above has been described with reference to a two-part housing, with the cavity defined by the gap between the two parts, other arrangements are possible. For example, the housing may be a single part with an opening for the piston, and the sample may (and upper elastomer pad) be inserted through the piston hole. Alternatively, the housing may comprise more than two parts, or may comprise a plurality of parts which connect by hinges or similar mechanisms.

Equally, while the above has described the use of a piston to provide pressure to the elastomer, other suitable arrangements for providing high pressure to the elastomer within the cavity may be used—for example, in the case of a two part housing, the housing may not have an opening for a piston. Instead, the housings may be capable of moving relative to each other while maintaining the cavity (e.g. by the use of a wall such as described in relation to FIG. 4), and pressure may be applied to the housings to push them together, and thereby transfer said pressure to the elastomer.

The different housing sections may be held together by bolts, clamps, or other suitable means.

The invention claimed is:

1. An apparatus for providing pressure to a sample, the apparatus comprising:
   a housing having a cavity;
   an elastomer within the cavity;
   a piston;
   wherein the housing and the elastomer are configured to allow a sample to be inserted into the cavity, such that the sample is surrounded by the elastomer and such that the elastomer and the sample together fill the cavity; and
   wherein:
   the cavity has a shape having an upper region with a first cross section, and a lower region with a second cross section which is greater in area than the first cross section;
   the elastomer extends into the upper region;
   a face of the piston is on one side of the cavity in the upper region; and
   piston provides a force to the elastomer in the upper region, and the apparatus is configured such that the sample is placed entirely in the lower region and is in contact with the elastomer.

2. The apparatus according to claim 1, wherein the elastomer fills the cavity when a sample is not present.

3. The apparatus according to claim 1, wherein the housing comprises first and second housing sections, and the elastomer comprises first and second elastomer pads, wherein the first and second housing sections are configured to separate to allow the sample to be placed between the elastomer pads.

4. The apparatus according to claim 3, wherein the first housing section comprises a wall, which, when the housing is assembled, lies inside and adjacent to an inner surface of the second housing section, the wall extending around the cavity.

5. A method of providing pressure to a sample, the method comprising:
- providing a housing having within it a cavity, wherein:
  - the cavity has a shape having an upper region with a first cross section, and a lower region with a second cross section which is greater in area than the first cross section;
  - the housing has a piston wherein one face of the piston is one side of the cavity in the upper region and the piston provides force to the elastomer in the upper region;
- inserting the sample into the cavity such that the sample is entirely in the lower region, the sample is surrounded by an elastomer and in contact with the elastomer, and such that the sample and the elastomer together fill the cavity and the elastomer extends into the upper region;
- applying pressure to the elastomer within the cavity via the piston.

6. The method according to claim 5, wherein the elastomer fills the cavity when a sample is not present.

7. The method according to claim 5, wherein the housing comprises first and second housing sections, and the elastomer comprises first and second elastomer pads, and wherein inserting the sample comprises:
- placing the sample between the first and second elastomer pads;
- assembling the housing by placing the first and second housing sections around the first and second elastomer pads such that the first and second housing sections form the cavity.

8. The method according to claim 7, wherein the first housing section comprises a wall, which, when the housing is assembled, lies inside and adjacent to an inner surface of the second housing section, the wall extending around the cavity.

9. The method according to claim 5, wherein the step of inserting the sample into the cavity comprises:
- inserting the sample into the cavity;
- casting the elastomer into the cavity around the sample.

* * * * *